United States Patent [19]

Gerow

[11] 4,301,719
[45] Nov. 24, 1981

[54] SEPARATING CITRUS PEEL INTO ALBEDO AND FLAVEDO COMPONENTS

[75] Inventor: Gordon P. Gerow, Davenport, Fla.

[73] Assignee: FMC Corporation, San Jose, Calif.

[21] Appl. No.: 151,223

[22] Filed: May 19, 1980

Related U.S. Application Data

[62] Division of Ser. No. 953,513, Oct. 23, 1978, Pat. No. 4,225,625.

[51] Int. Cl.³ .............................................. A23N 1/02
[52] U.S. Cl. ...................................... 99/510; 99/513; 99/584
[58] Field of Search ................ 99/495, 509, 510, 513, 99/516, 537, 584; 426/481, 482, 518; 209/315, 325, 326; 241/72, 75, 76

[56] References Cited

U.S. PATENT DOCUMENTS 3,647,475  3/1972  Douglas ............................. 426/482
4,226,709  10/1980 Popper ............................... 209/315

Primary Examiner—Harvey C. Hornsby
Assistant Examiner—Timothy F. Simone
Attorney, Agent, or Firm—R. S. Kelly

[57] ABSTRACT

Citrus peels discharged from a juice extractor are first comminuted with water to form a slurry, and thereafter the slurry of comminuted peels and water is screened to separate from the slurry a larger particle size fraction consisting mainly of the flavedo portion of the peels and a smaller particle size fraction consisting mainly of the albedo portion of the peels. A preferred apparatus for separating peels into albedo and flavedo fractions includes a comminutor which utilizes a cutting action to reduce the peels to finely divided particles. Water is added to the comminutor to fluidize the peels so as to facilitate their movement through the comminutor and also to facilitate subsequent screening. The slurry of water and comminuted peels is sifted using a vibratory screen having an upper screen of a 20 Tyler mesh size to remove the flavedo fraction from the slurry and having a lower screen of a 60 Tyler mesh to separate the albedo fraction from the remaining slurry.

4 Claims, 1 Drawing Figure

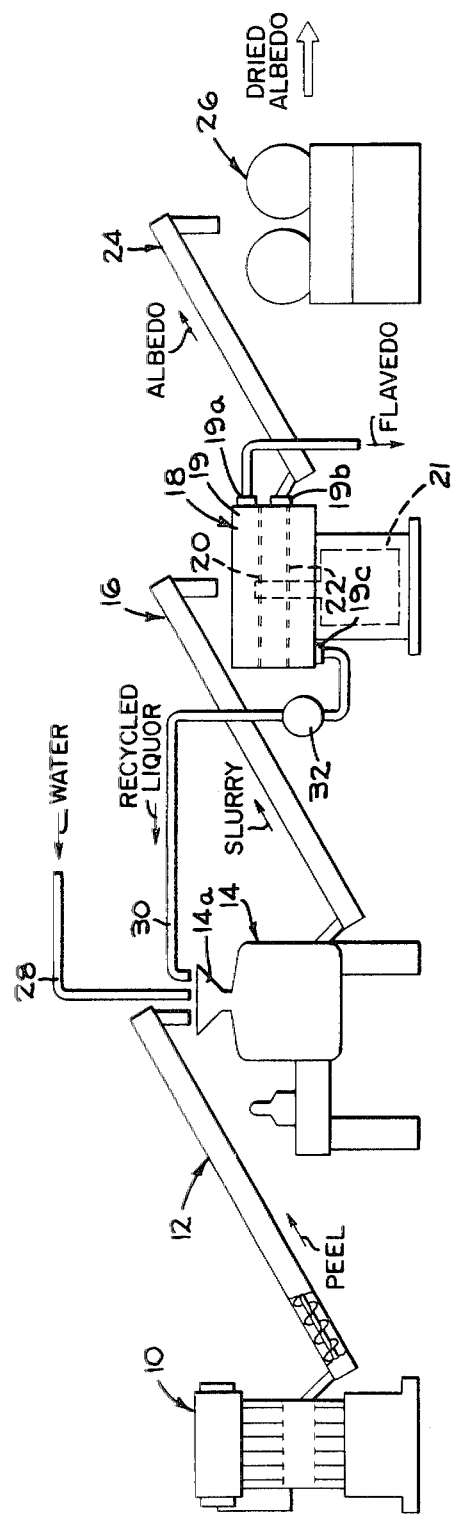

SEPARATING CITRUS PEEL INTO ALBEDO AND FLAVEDO COMPONENTS

This is a division of application Ser. No. 953,513 filed Oct. 23, 1978, U.S. Pat. No. 4,225,625.

BACKGROUND OF THE INVENTION

1. Field of the Invention

The present invention generally relates to a method of and an apparatus for processing citrus peel, and more particularly it concerns a method of and an apparatus for separating citrus peel into its flavedo and albedo fractions.

2. Description of the Prior Art

As is well known, many uses have been found for the albedo and flavedo portions of citrus peel. For example, the albedo fraction of the citrus peels has been used for its dietary fiber value, as a clouding agent in beverages and as a filler material in the preparation of pet food. A use for the flavedo fraction has been as a coloring agent in the preparation of foodstuffs. Uses for by-products of citrus peel are indicated in the following patents: U.S. Pat. No. 3,647,475, which indicates that the albedo fraction can be used in a finely divided form as a clouding agent in citrus fruit juice; U.S. Pat. No. 2,708,627, wherein it is stated that the flavedo fraction is a satisfactory source of carotene and xanthophyll and that the albedo fraction may be used to fortify stock foods; U.S. Pat. No. 3,239,359, which indicates that the albedo fraction is useful in making animal feeds and as an additive for the production of a cereal for human consumption; U.S. Pat. No. 2,452,750, which states that the albedo fraction is an extremely rich source of protopectine which, when converted into a water-soluble pectin, can be used as a supplemental food product for human consumption; U.S. Pat. No. 3,868,466, which discloses a method for dehydrating and treating whole citrus peels to produce a food additive; U.S. Pat. No. 2,186,907, which describes a method of making a dried citrus food product which is especially suited for animal feed and possibly also for human food and wherein the peel, seeds and rag of citrus fruit are ground and screened to form a thick paste which is thereafter dried and flaked; and U.S. Pat. No. 2,976,159, which discloses the use of the albedo fraction to produce a carrier for food flavors. It will thus be appreciated that citrus peels have been commercially processed into a variety of food products for a long period of time.

The only previously known method for separating citrus peel into its flavedo and albedo fractions is by shaving or peeling the flavedo fraction from the albedo fraction. A shaving method of separating peel is subject to several problems. First, there is no clear line of demarcation between the colored flavedo portion and the white albedo portion of citrus peel. Thus, in order to obtain an albedo fraction which is sufficiently free from flavedo, it is necessary to set the shaving or peeling apparatus to either cut deeply through the outer flavedo layer and well into the albedo layer or, vice versa, to cut only a thin layer of the albedo from the peel. This results in a wasting of the portion of the albedo which remains attached to the separated flavedo fraction.

Another problem arises as a result of the condition in which the peel is provided to the peeling or shaping apparatus. When whole half peels are to be handled, it will be appreciated that it will be relatively easy to orient the peel with the flavedo and albedo portions in an orientation such that the flavedo or the albedo may be removed from the remaining part. However, much of the in-line juice extraction equipment now used in the citrus juice industry does not produce a whole half peel, but rather produces masses of randomly oriented, shredded and crumpled peel segments. An example of an extraction apparatus which will produce the latter type of peel produce is disclosed in U.S. Pat. No. 2,649,730, issued in 1953 to J. M. Hait. As shown and described in this patent, the extractor includes upper and lower cups adapted to interdigitate as the upper cup is plunged downwardly. The fruit is received in the lower cup, and, as the cups come together, the juice is extracted and simultaneously the peel is crumpled and partially shredded and expelled in such condition from the extractor. Peel in such condition is randomly oriented during discharge and is not readily susceptible to separation by a shaving method.

SUMMARY OF THE INVENTION

The present invention provides a method of and an apparatus for separating citrus peel into its albedo and flavedo components which completely eliminates the aforementioned problems of the prior art methods and apparatus. The invention stems from a discovery that when citrus peel is comminuted, the albedo portion of the peel is reduced to particles of smaller sizes than the flavedo portion. Thus, citrus peel is separable into its albedo and flavedo fractions by first comminuting the peel and then separating the comminuted peel into a larger particle size fraction, consisting mainly of the flavedo portion of the peel, and a smaller particle size fraction, consisting of the albedo portion of the peel. Preferably, the peel is comminuted in the presence of water, and the slurry of water and comminuted peel is separated by a vibratory screen which includes upper and lower screens. The upper screen has a relatively coarse mesh size, such as 20 Tyler mesh, adapted to separate a wet flavedo fraction from the slurry, and the lower screen has a relatively fine mesh size, such as 60 Tyler mesh, adapted to separate a wet albedo fraction from the remaining portion of the slurry.

BRIEF DESCRIPTION OF THE DRAWING

The drawing is a diagrammatic view of a citrus peel processing system which receives peel discharged from a juice extractor and which separates the peel into albedo and flavedo fractions.

DESCRIPTION OF THE PREFERRED EMBODIMENTS

As indicated hereinbefore, it has been found that citrus peel may be separated into albedo and flavedo fractions by first comminuting the peel and thereafter sifting the comminuted peel to separate a larger particle size fraction thereof from a smaller particle size fraction thereof, with the larger particle size fraction consisting mainly of the flavedo portion of the peel and the smaller particle size fraction consisting mainly of the albedo portion of the peel. A few specific examples of a batch type of method for separating citrus peel into albedo and flavedo fractions will be described first, and thereafter a preferred embodiment of a system for continuously separating citrus peel discharged from a juice extractor will be described.

As used hereinafter, the term "comminute" shall be interpreted in its generic dictionary sense, that is, to reduce the citrus peel into minute particles. It will be understood that the comminution of the peel may be accomplished by cutting, slicing, milling, hammering, mashing, or grinding the peel. As will be described hereinafter, it has been found that the size reduction of the peel is most efficiently accomplished by a cutting or slicing action rather than by an attrition action, such as milling, hammering, or mashing. Cutting action has been found to result in less particle size variation, especially in reducing the percentage of relatively large particles. It has been found, however, that in the event that the comminution of the peel results in a relatively large particle size variation, the larger particle size fraction of the ground peel material, which is separated by subsequent sifting, may be recycled through the comminution apparatus to reduce the larger peel particles of such fraction to smaller sizes and thereby improve the yield and quality of the albedo and flavedo fractions.

The following Examples set forth specific preferred embodiments of a batch type of method of separating citrus peel into flavedo and albedo components.

EXAMPLE I

A batch type of method for separating grapefruit peel was carried out using the Urschel Comitrol Model 3600 comminution apparatus manufactured by the Urschel Laboratories Inc. of Valparaiso, Indiana. This comminutor was provided with a circular cutting head assembly having a spacing of 0.020 inches between horizontal cutting blades thereof. In such a comminution apparatus, several stacks of the cutting blades are stationarily mounted in a fixed circular array surrounding the rotary path of an impeller. The peels fed to the comminutor are moved through the stationary cutting blades by the centrifugal force exerted on the peels by the rotating impeller. Size reduction is accomplished by an incremental cutting or slicing action, rather than by an attrition action, such as hammering, mashing, paring or ripping. One hundred pounds of peel segments of Duncan grapefruits were collected in a shredded and crumpled form as discharged from the aforementioned interdigitating cup type of juice extractor set forth in U.S. Pat. No. 2,649,730. The grapefruit peel was mixed with 300 pounds of water, and this mixture was fed to the comminution apparatus. The water fluidizes the peel so as to facilitate movement through the cutting blades and form a slurry which is more readily separated by vibratory screening, or sifting. The slurry output of water and comminuted peel particles was fed to a conventional, 18-inch diameter vibratory screen manufactured by Sweco, Inc. of Los Angeles, California. The vibratory screen has a 20 Tyler mesh stainless steel upper screen superimposed above a 60 Tyler mesh stainless steel lower screen. A larger particle size fraction was separated by the 20 mesh screen, and a smaller particle size fraction was separated by on the 60 mesh screen. The fraction of wet peel material collected from the 20 mesh screen weighed 117.8 pounds, which if dried to a 10% moisture content, was calculated to yield 11.8 pounds of dried peel material. The yield of the fraction of wet peel material collected on the 60 mesh screen was 60.6 pounds, which if reduced to a 10% moisture content would be 4.7 pounds of dried peel material.

Examination of both of the separated fractions under a wide angle, low power microscope revealed that the fraction separated by the 60 mesh screen consisted of at least 95% albedo. The larger particle size fraction consisted of 45% to 50% flavedo. Particle size tests revealed that approximately 15% of the large particle fraction separated by the 20 mesh screen would be retained on a 10 mesh screen. It was suspected that the portion of this large particle size fraction which was larger than 10 mesh size has a considerable percentage of albedo therein. Therefore, it was determined that for this type of grapefruit peel, a better separation could be made by initially comminuting the peel to a finer degree.

EXAMPLE II

Another test was conducted on the same batch of Duncan grapefruit peel used in the previous example. The Urschel Comitrol Model 3600 comminution apparatus was refitted with a cutting head assembly having 0.125 inch spacings between the cutting blades thereof. One hundred pounds of this grapefruit peel was mixed with 300 pounds of water and was comminuted in such apparatus to obtain a slurry of relatively coarsely divided peel and water. The comminution device was next refitted with a cutting head assembly having 0.015 inch spacings between the cutting blades thereof, and the slurry of coarsely cut peel and water was then fed to such refitted comminution device. The slurry output was then sifted on the aforementioned Sweco vibratory screen. The weight of the wet, small particle size fraction separated by the 60 mesh screen was 106 pounds, which was calculated to be 11.4 pounds of dried peel material at a 10% moisture content. The weight of the wet fraction separated by the 20 mesh screen was 114 pounds. The liquor portion of the slurry which passed through both screens was then mixed with the larger particle size fraction collected from the 20 mesh screen, and this mixture was recycled through the vibratory screen. The second pass through the vibratory screen yielded 35.2 additional pounds of a wet, smaller particle size fraction and 78.8 pounds of a wet larger particle size fraction. Thus, in the first and second passes through the screens, it is calculated that a total of 15.2 pounds of the smaller particle size fraction at a 10% moisture content was recovered. The 78.8 pounds of the larger particle size fraction recovered in the second pass through the vibratory screen is calculated to be equivalent to 8.7 pounds of dried peel material at a 10% moisture content.

The smaller particle size fractions recovered in such first and second passes were examined under a low power microscope and were found to contain at least 90% albedo, that is, less than 10% flavedo. The larger particle size fraction obtained in the second pass through the screens was also examined and found to contain mainly the flavedo fraction, but to have approximately 20% to 30% albedo therein. This flavedo fraction was relatively uniform in color and appearance despite the presence of albedo therein. Samples of both of the albedo and flavedo fractions were dried and tasted. Both were found to have a bland flavor, thus indicating that substantially all of the bitter-tasting oils present in whole fresh peel had been eliminated from the peel.

The liquor portion of the slurry which passed through both screens on the second pass therethrough was found to contain approximately 20.5% peel material by volume. This liquor portion was centrifuged in a conventional clinical centrifuge at 1500 RPM for ten minutes. The finely divided peel material separated by this centrifugation was examined and determined to consist of at least 95% albedo. Accordingly, it was determined that a greater percentage of albedo recovery could be obtained by subjecting the liquor passing through the 20 and 60 mesh screens to either centrifugation or to screening with a very fine screen, such as a 180 Tyler mesh screen. It was determined that the liquor portion recovered after the second screening pass, as just described, could be centrifuged to remove 36.9 pounds of albedo, which, if dried to a 10% moisture content, was calculated to be about 4.0 pounds of dried albedo.

EXAMPLE III

Twenty-five pounds of peel segments from mid-season Florida oranges was mixed with 75 pounds of water and comminuted by the Urschel Comitrol Model 3600 comminutor equipped with a cutting head assembly having 0.015 inch spacings between the cutting blades thereof. The slurry output of this comminution was sifted in the dual screen Sweco vibratory screen, as described hereinbefore in connection with the Examples I and II. Thirty-two pounds of the larger particle size fraction of the slurry was collected from the upper 20 mesh screen, and 10.6 pounds of the smaller particle size fraction was collected from the 60 mesh screen. All of the larger particle size fraction was mixed with all of the receovered liquor which had passed through the 60 mesh screen. This mixture was comminuted a second time in the Urschel Comitrol comminutor again fitted with a cutting head asembly having the 0.015 inch spacings between its cutting blades. The recomminuted slurry was collected and fed to the vibratory screen device. After such a second pass through the comminutor and vibratory screen, 26.4 pounds of wet peel material was recovered from the 20 mesh upper screen, and 67 additional pounds of wet peel material was recovered from the 60 mesh lower screen. Thus, a total of 17.3 pounds of the smaller particle size fraction was recovered from the 25 pounds of orange peel in both passes.

The 26.4 pounds of the wet, larger particle size fraction obtained by the second comminuting and screening pass was examined under a microscope and was found to consist of mainly the flavedo portion of the orange peel, but to contain between 30% to 40% albedo. This fraction was, however, relatively uniform in color and appearance. The smaller particle size fractions obtained by both passes were examined, and both were found to consist of 93–95% albedo particles.

As in Example II set forth hereinbefore, the liquor portion which passed through both screens of the vibratory screening device on the second pass therethrough was found to contain a significant amount of finely divided peel material. Such finely divided material was separated by centrifugation at 1500 RPM for ten minutes in a clinical centrifuge. An additional 10.6 pounds of wet finely divided peel material was separated from the liquor by this centrifugation.

EXAMPLE IV

Twenty-five pounds of fresh, shredded, Valencia orange peel, which was in a segmented condition as discharged from the aforementioned interdigitating cup type of juice extractor, was mixed with 75 pounds of water and comminuted in the Urschel Comitrol Model 3600 comminutor having a cutting head assembly which had 0.015 inch spacings between its cutting blades. The slurry was then screened slowly in the aforementioned Sweco vibratory screen equipped with a 20 mesh screen on top and a 60 mesh screen therebelow. In such screening, small amounts of the slurry were intermittently fed to the vibrating screen until all the slurry had been screened. The weight of the wet fraction separated by the upper 20 mesh screen was 15 pounds, 8 ounces and was observed to be mainly comprised of the orange flavedo portion of the orange peel. The weight of the wet fraction separated by the 60 mesh screen was 30 pounds, 8 ounces, and this fraction was observed to consist mainly of the white albedo portion of the peel. Assuming that the separated albedo fraction had a 90% moisture content and that the separated flavedo fraction had a 90% moisture content, it was calculated that 2.7 pounds of dried albedo at a 10% moisture content and 1.7 pounds of dried flavedo at a 10% moisture content can be separated from 25 pounds of this type of citrus peel.

It is generally known that the peel of grapefruit and oranges is 65–75% albedo and 25–35% flavedo. Based on prior laboratory observations, the type of oranges processed in this Example consists of 65–70% albedo. The moisture content of such whole peel is reported in the literature to be 81–84% by weight. Based on these assumptions, the yield of the albedo fraction in the present Example was approximately 88% of the total albedo portion of the 25 pounds of orange peel subjected to the comminuting and screening procedure of the present invention.

EXAMPLE V

Twenty-five pounds of shredded grapefruit peel discharged from the aforementioned type of juice extractor was mixed with 75 pounds of water, and this mixture was fed to the Comitrol comminutor described in Example IV. The slurry output from the comminutor was collected and fed at a slow rate of approximately 2 pounds per minute to the aforementioned Sweco vibratory screen. The fraction collected from the upper 20 mesh screen weighed 11 pounds, 1 ounce and was observed to be mainly flavedo. The fraction taken from the 60 mesh screen weighed 34 pounds, 8 ounces and was observed to be mainly albedo. Assuming the whole grapefruit peel which was processed has a moisture content of 81–84% and that the albedo portion is 70–75% of the whole peel, the yield of the albedo fraction was calculated to be approximately 95% of the albedo available in the 25 pounds of input peel.

Continuous Separation System

A system for continuously separating peel into its flavedo and albedo fractions will now be described in connection with the Drawing. Generally, the peel processing system is employed in combination with a juice extractor 10 and receives citrus peel discharged from the juice extractor for separating at least the albedo fraction from the peel. Generally, the system includes a comminutor 14 for comminuting the peel discharged from the extractor and a vibratory screen 18 for separating the comminuted peel material discharged from the comminutor into an albedo fraction and a flavedo fraction. The system further comprises a double-drum drying apparatus 26 for drying the albedo fraction separated by the vibratory screen. The dried albedo output from the drier 26 may then be handled by further equipment (not shown) to store the dried albedo material in suitable packages.

As diagrammatically shown in the Drawing, the extractor 10 includes a plurality of pairs of cups which are adapted to interdigitate as the upper ones of the cups are forced downwardly against fruits resting in the lower cups. As previuosly stated, this type of extractor is generally described in prior U.S. Pat. No. 2,649,730 issued to James Hait in 1953, and such patent is incorporated herein by reference. However, inasmuch as the albedo-flavedo separation system of the present invention is adapted to handle peel discharged from any kind of juice extractor, the present invention is not limited to operation with the type of extractor shown in the Hait U.S. Pat. No. 2,649,730. As generally known, the extractor of the type shown in the aforementioned patent includes suitable means for collecting the randomly oriented, shredded and crumpled peel, which is forced upwardly around each of the upper cups of the extractor, and for directing the crumpled peel to a conveyor 12.

The conveyor 12, as diagrammatically shown in the Drawing, is a conventional screw conveyor. The inlet end of the conveyor 12 is positioned to receive the shredded peel discharged from the extractor, and the outlet end of the conveyor is positioned above a hopper 14a of the comminutor 14. As will be discussed further hereinafter, water and recycled liquor from the separator 18 is fed by pipes 28 and 30, respectively, to the hopper of the comminutor so as to form a mixture of water and shredded peel. The water and recycled liquor serve to fluidize the peel as it is ground within the comminutor and thus facilitate its movement through the comminutor. The comminutor is of the aforedescribed type which utilizes a cutting, or slicing, action to reduce the peel to finely divided particles. A suitable comminutor for the continuous system is manufactured by Urschel Laboratories Inc. of Valparaiso, Indiana; more specifically, the Urschel Comitrol Model 1700 comminutor is considered to be a suitable comminuting device for the purposes of the present invention. The Urschel type of comminutor, as previously indicated, includes a stationary cutting head assembly which has several stacks of horizontal cutting blades arranged in a circular array about a centrifugal impeller. The cutting head further includes vertical slicing blades positioned between the cutting blades. The peels are incrementally sliced by the slicing blades, and the cutting blades dice the sliced pieces of the peels. This type of comminutor has been found to produce more uniformly sized peel particles than conventional hammer mills or blenders. Details of construction of the Urschel comminutors are generally known and may be found in the trade literature published by Urschel Laboratories Incorporated on their equipment.

A screw conveyor 16 is provided to receive the discharge from the comminutor 14 and direct it to the separator 18. Conveyor 16 has its inlet end positioned to receive the slurry of peel particles and water that is discharged from the comminutor 14 and has its outlet end positioned to direct such slurry to the circular upper screen 20 (shown in dashed outline) of the vibratory screen separator 18. The vibratory screen separator 18 also includes a circular lower screen 22 (shown in dashed outline) mounted directly below the upper screen 20 within a cylindrical housing 19. The upper screen 20 is a 20 Tyler mesh screen, and the lower screen 22 is a 60 Tyler mesh screen. The vibratory separator includes suitable drive means 21 for oscillating, or shaking, the screens. A suitable vibratory screen separator for use in the system of the present invention is the Sweco Vibratory Separator, Model LS30SS6666, manufactured by Sweco, Inc. of Los Angeles, California. Such separator is adapted to receive two vertically spaced screens having 30 inch diameters. The vibratory separator has outlets 19a, 19b and 19c formed in the cylindrical housing 19 for respectively discharging the material fed from the upper screen 20, the lower screen 22, and from below the lower screen. The flavedo fraction is separated by the 20 mesh upper screen and thus is discharged through the outlet 19a. The albedo portion of the peel is separated by the 60 mesh lower screen and thus is transferred through the outlet 19b. The liquor portion of the slurry fed to the vibratory screen is discharged from the outlet 19c.

As shown in the Drawing, a further screw conveyor 24 has its inlet end positioned to receive the wet albedo fraction discharged from the outlet 19b and has its outlet end positioned to deliver the albedo fraction to the double-drum drier 26. The double-drum drier is a conventional drier such as are manufactured by Blaw-Knox Food & Chemical Equipment, Inc. of Buffalo, New York. The albedo fraction separated by the vibratory separated 18 and delivered to the drier is expected to consist of approximately 92% water. The drier serves to dry the albedo fraction so that it may be readily packaged. Depending upon the end use of the albedo fraction, the output of the double-drum drier may be milled and screened to provide a flaked product of a suitable consistency for packaging.

The flavedo fraction separated by the upper screen 20 and discharged through the outlet 19a may, if desired, be delivered to a suitable conveyor (not shown) which will direct it to another double-drum drier (also not shown) so that the flavedo fraction can be accumulated and stored. The liquor portion recovered from below the lower screen 22 and discharged through the outlet 19c is recycled through the conduit 30 to the hopper 14a of the communitor 14 and mixed with the peel delivered to the comminutor. A pump 32 is provided in the conduit 30 to move the liquor from the vibratory separator to the comminutor. The water supplied from the conduit 28 and the recycled liquor sufficiently fluidize the peel as it is ground within the comminutor to thereby facilitate movement of the peel through the comminutor. The water also facilitates efficient screening in the separator. Three pounds of water may be provided for each pound of peel fed to the comminutor.

It is expected that the aforedescribed system will be capable of receiving 2,000 pounds of peel per hour and of continuously grinding and screening such peel so as to transfer, from the outlet 19b of the separator, 2800 pounds of wet albedo per hour to the double-drum drier. It is calculated that the system will thus produce 250 pounds of dried albedo (at a 10% moisture content) per hour from the 2000 pounds of peel discharged from the extractor each hour.

Although the best modes contemplated for carrying out the present invention have been herein shown and described, it will be apparent that modification and variation may be made without departing from what is regarded to be the subject matter of the invention.

What is claimed is:

1. In combination with a juice extractor which separates the peels of citrus fruits, said peels including both the albedo and flavedo of the fruits, from the remainder of the fruits, an apparatus for separating a substantially pure albedo fraction from the peels discharged from the extractor comprising: means for comminuting the peels, including both the albedo and flavedo portions, into finely divided particles to the extent that the entire peel is comminuted into a mass of particles wherein the particles comprised of substantially pure albedo are more finely divided relative to the larger particles which contain a significant proportion of flavedo; means for conveying peels discharged from the extractor to said comminuting means; means for separating said smaller particle size albedo fraction from the relatively larger peel particles discharged from said comminuting means to thereby provide an albedo fraction; and means for conveying the comminuted peel particles discharged from said comminuting means to said separating means.

2. The combination according to claim 1 further comprising means for supplying water to said comminuting means to thereby form a slurry of said peel particles and the water, said separating means including a first screen and means for shaking the screen, said first screen having openings for permitting a slurry of water and the smaller particle size fraction to pass therethrough.

3. The combination according to claim 2 wherein said separating means includes a second screen and means for shaking the first and second screens, said second screen having relatively small openings therein adapted to retain the majority of said small particle size fraction to thereby collect a wet albedo fraction from the slurry fed to said separating means.

4. The apparatus according to claim 3 wherein said first screen has 20 Tyler mesh size openings and said second screen has 60 Tyler mesh size openings.

* * * * *